(12) United States Patent
Yi et al.

(10) Patent No.: US 10,257,736 B2
(45) Date of Patent: Apr. 9, 2019

(54) METHOD AND APPARATUS FOR PERFORMING RRM MEASUREMENTS IN UNLICENSED BAND IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/522,933

(22) PCT Filed: Oct. 30, 2015

(86) PCT No.: PCT/KR2015/011573
§ 371 (c)(1),
(2) Date: Apr. 28, 2017

(87) PCT Pub. No.: WO2016/068642
PCT Pub. Date: May 6, 2016

(65) Prior Publication Data
US 2017/0339592 A1    Nov. 23, 2017

Related U.S. Application Data

(60) Provisional application No. 62/072,998, filed on Oct. 30, 2014.

(51) Int. Cl.
H04W 24/10    (2009.01)
H04W 16/14    (2009.01)
H04W 24/08    (2009.01)
H04B 17/327    (2015.01)
H04B 17/318    (2015.01)

(52) U.S. Cl.
CPC .......... *H04W 24/10* (2013.01); *H04B 17/318* (2015.01); *H04B 17/327* (2015.01); *H04W 16/14* (2013.01); *H04W 24/08* (2013.01)

(58) Field of Classification Search
None
See application file for complete search history.

(56) References Cited

U.S. PATENT DOCUMENTS 9,119,036 B2 *  8/2015  Kazmi ................. G01S 5/0242
2011/0274007 A1 * 11/2011  Lin ................... H04W 36/0094
                                                              370/254

(Continued)

OTHER PUBLICATIONS

Huawei et al., "Design targets of LAA-LTE for co-existence in unlicensed spectrum", R1-143725, 3GPP TSG RAN WG1 Meeting #78bis, Ljubljana, Slovenia, Oct. 6-10, 2014, See pp. 1-2.

(Continued)

*Primary Examiner* — Hong S Cho
(74) *Attorney, Agent, or Firm* — Birch, Stewart, Kolasch & Birch, LLP

(57) ABSTRACT

A method and apparatus for configuring a measurement gap for an unlicensed carrier in a wireless communication system is provided. A user equipment (UE) configures a first measurement gap for a licensed carrier, and configures a second measurement gap, which is different from the first measurement gap, for the unlicensed carrier.

15 Claims, 11 Drawing Sheets

(56) References Cited

U.S. PATENT DOCUMENTS

| | | | | |
|---|---|---|---|---|
| 2012/0184290 A1* | 7/2012 | Kazmi | ............... | G01S 5/0242 |
| | | | | 455/456.1 |
| 2012/0309336 A1 | 12/2012 | Tanaka et al. | | |
| 2013/0059610 A1* | 3/2013 | Siomina | ............... | H04W 24/10 |
| | | | | 455/456.6 |
| 2013/0295958 A1* | 11/2013 | Siomina | ............... | G01S 5/0205 |
| | | | | 455/456.1 |
| 2014/0302865 A1* | 10/2014 | Bai | ............... | H04W 24/10 |
| | | | | 455/452.1 |
| 2015/0092768 A1* | 4/2015 | Ng | ............... | H04W 48/16 |
| | | | | 370/350 |
| 2015/0117287 A1* | 4/2015 | Kim | ............... | H04W 52/0216 |
| | | | | 370/311 |
| 2015/0327054 A1* | 11/2015 | Callender | ............ | H04W 8/183 |
| | | | | 370/329 |
| 2016/0066204 A1* | 3/2016 | Khawer | ............. | H04W 72/085 |
| | | | | 455/500 |
| 2016/0073366 A1* | 3/2016 | Ng | ............... | H04W 56/001 |
| | | | | 370/329 |

OTHER PUBLICATIONS

NEC, "Required functionalities for LTE in unlicensed band", R1-143936, 3GPP TSG RAN WG1 Meeting #78bis, Ljubljana, Slovenia, Oct. 6-10, 2014, See pp. 1-2.

* cited by examiner

[Fig. 1]
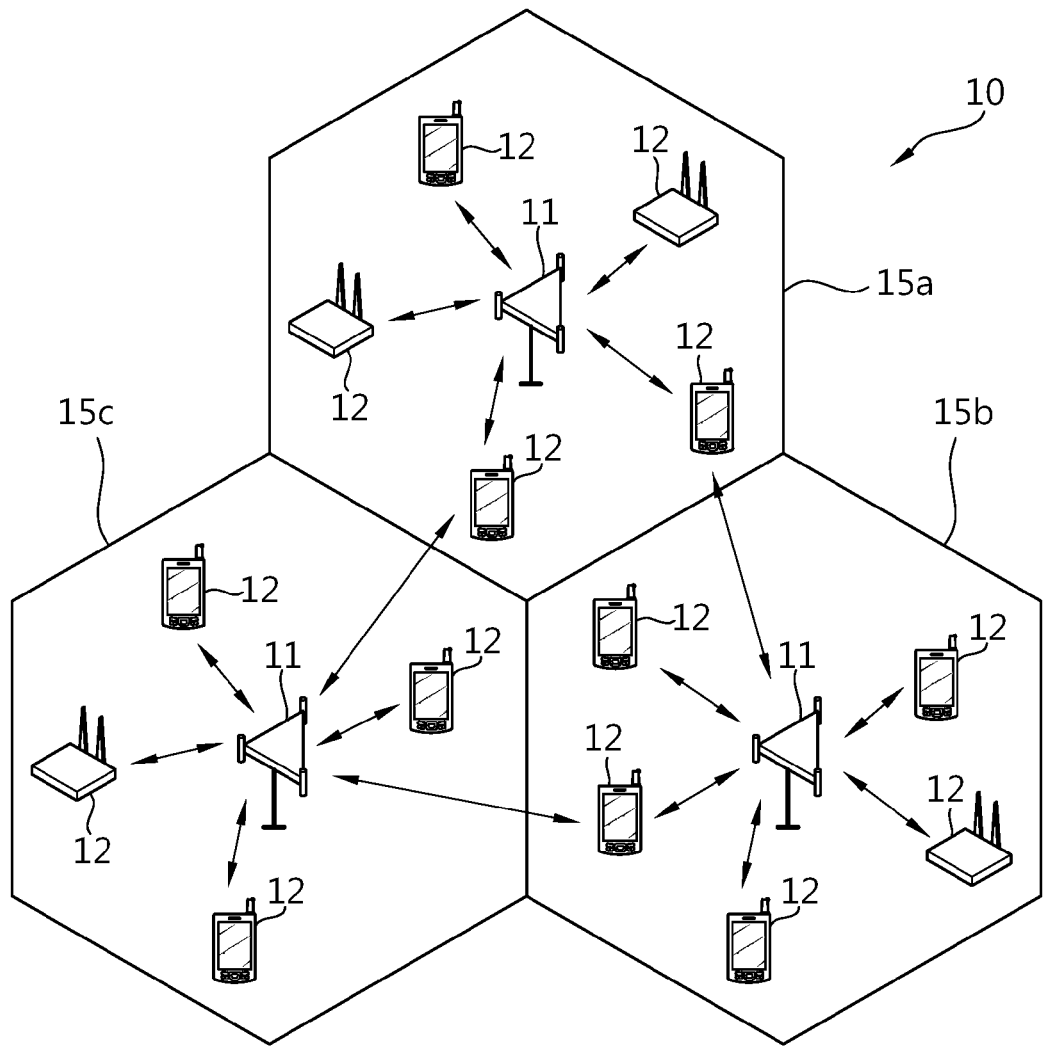
[Fig. 2]
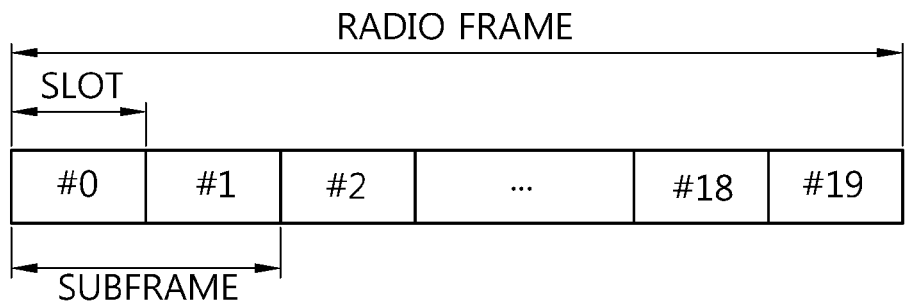

[Fig. 3]
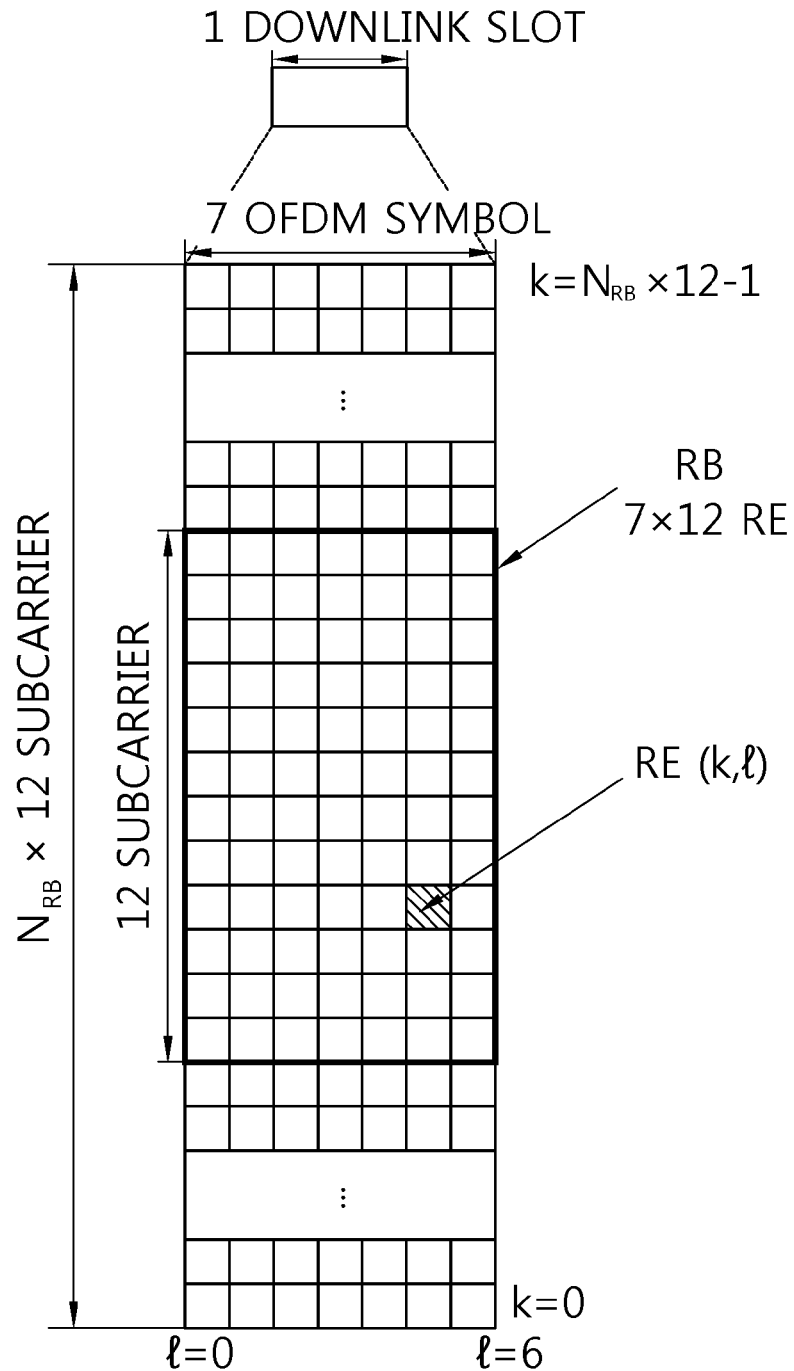

[Fig. 4]
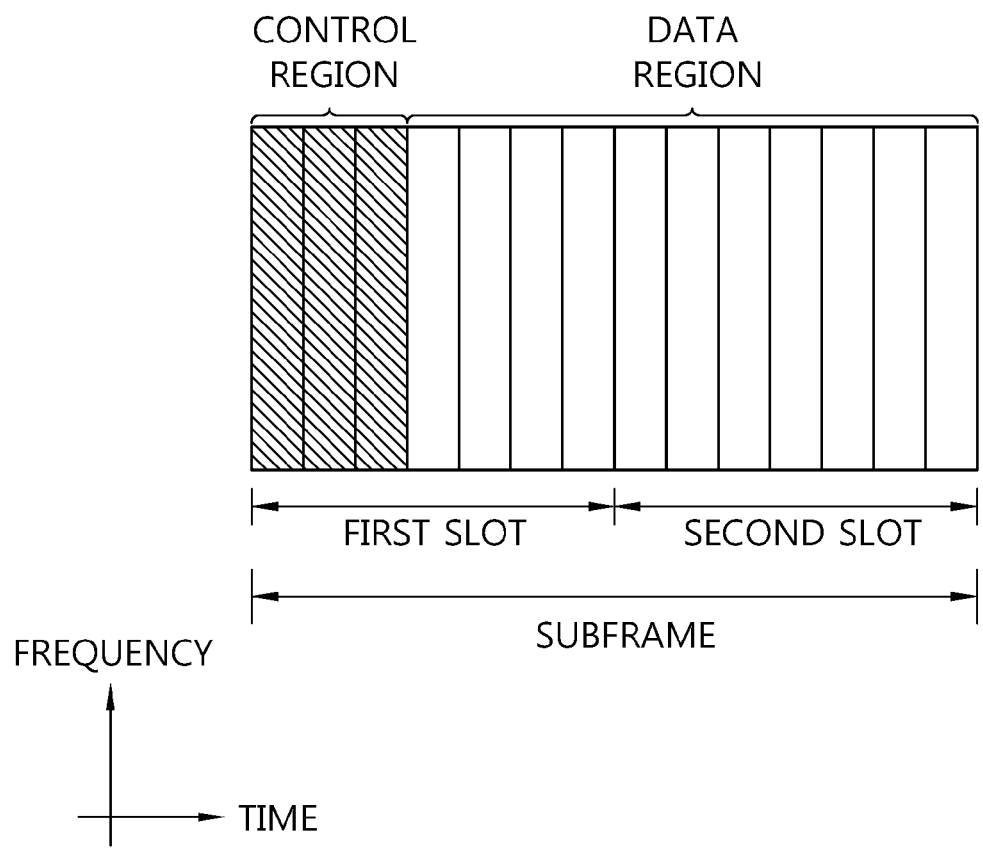

[Fig. 5]
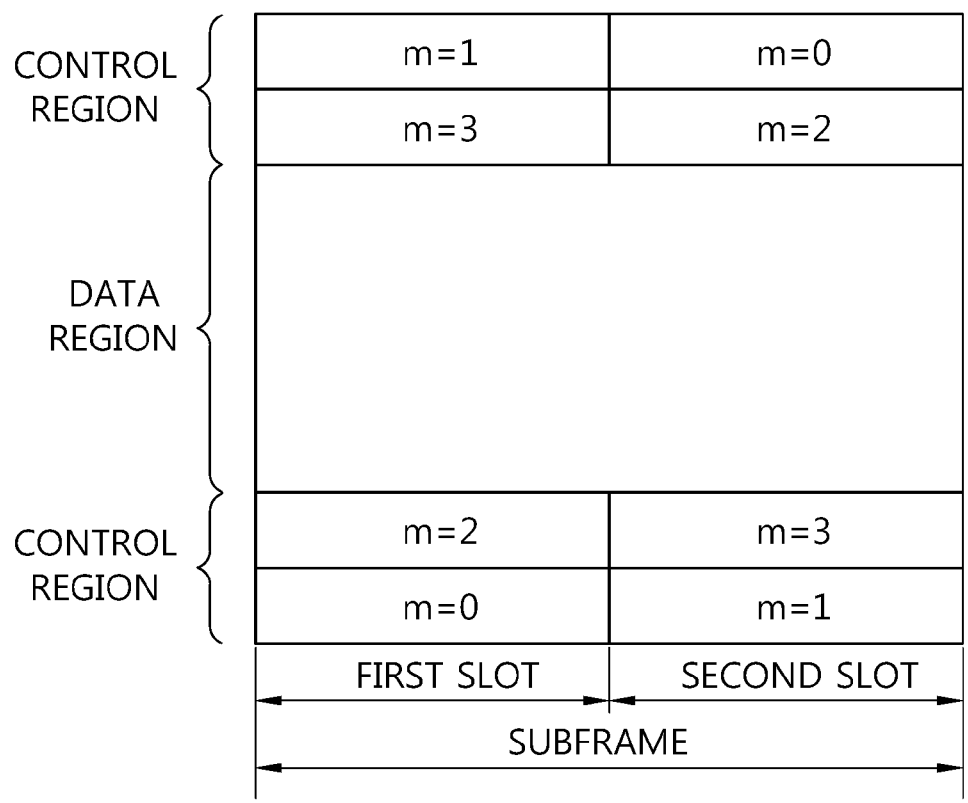
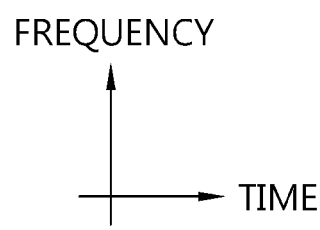

[Fig. 6]
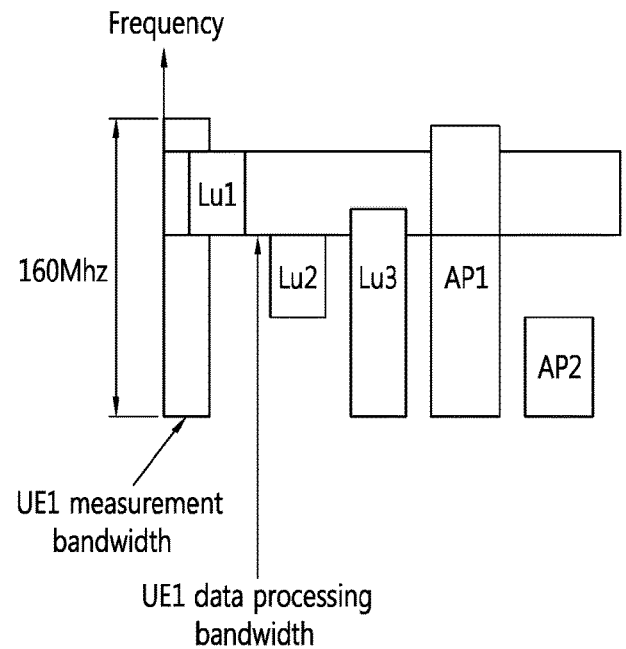
[Fig. 7]
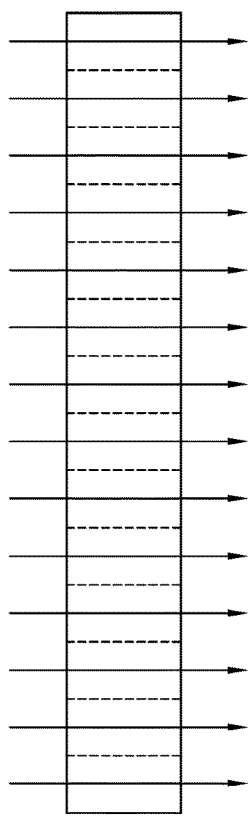

[Fig. 8]
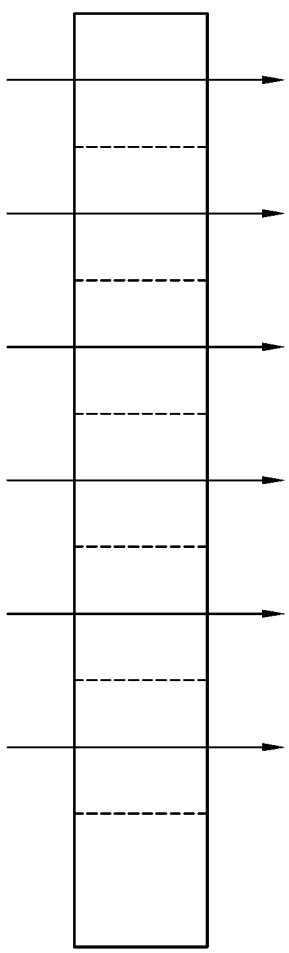

[Fig. 9]
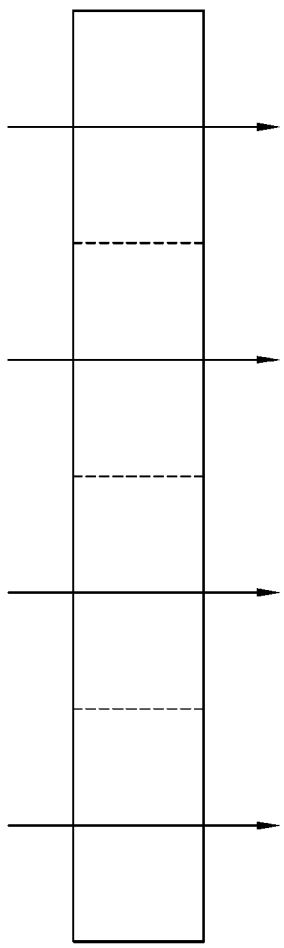

[Fig. 10]
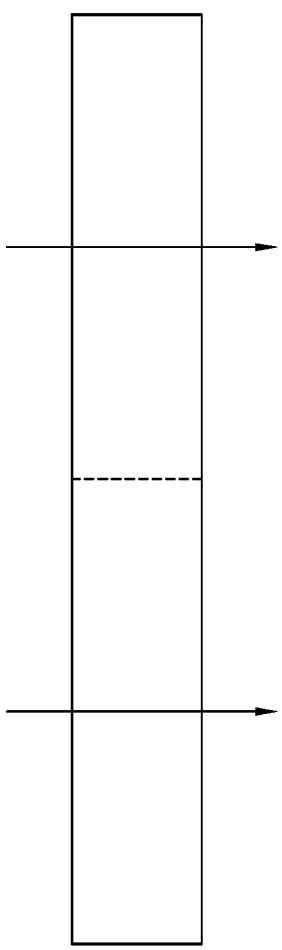

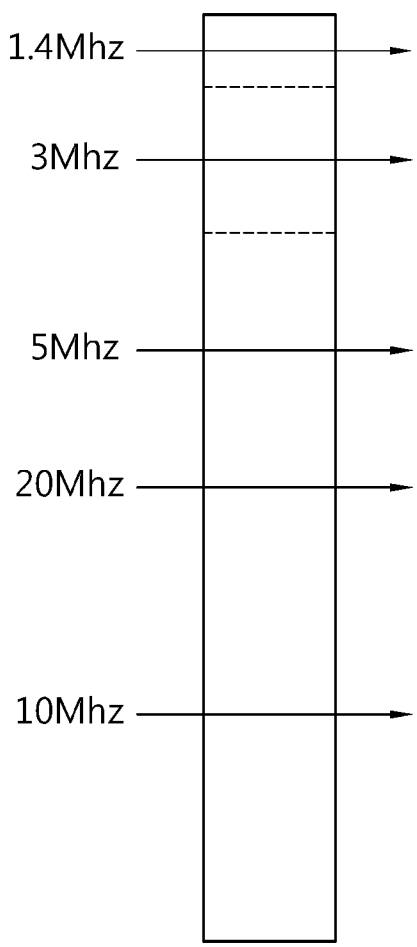
[Fig. 11]

[Fig. 12]
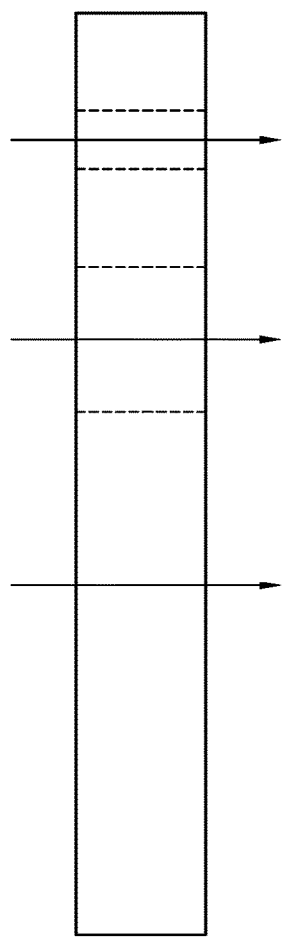
[Fig. 13]
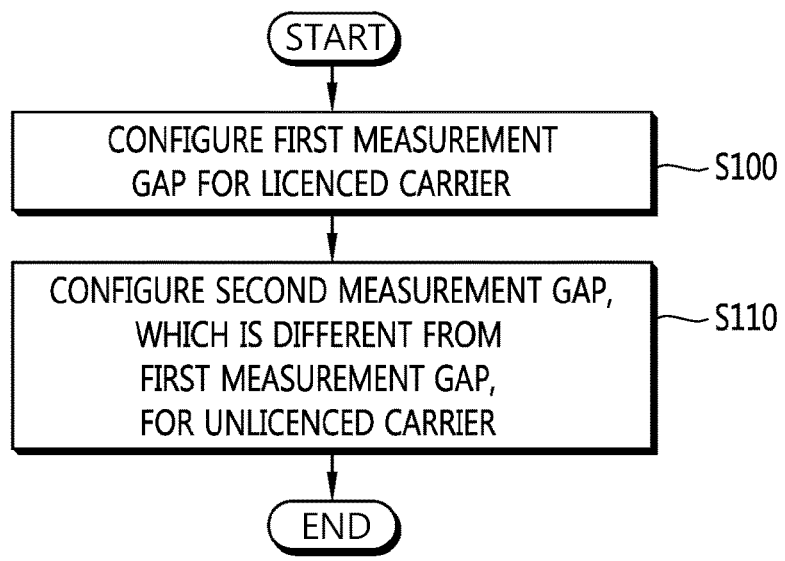

[Fig. 14]
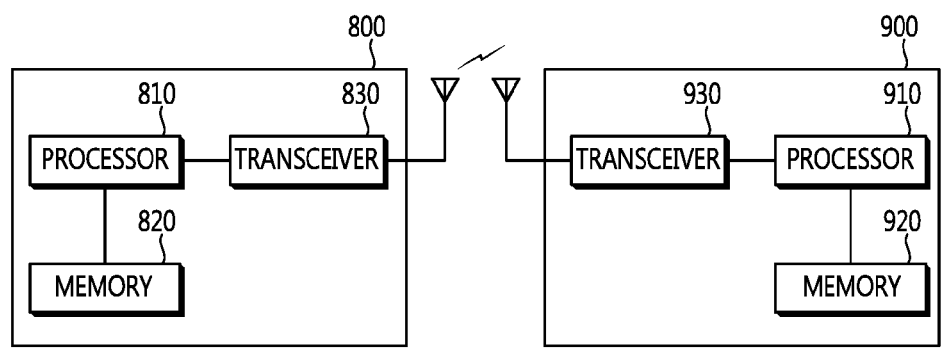

METHOD AND APPARATUS FOR PERFORMING RRM MEASUREMENTS IN UNLICENSED BAND IN WIRELESS COMMUNICATION SYSTEM

CROSS REFERENCE TO RELATED APPLICATIONS:

This application is the National Phase of PCT International Application No. PCT/KR2015/011573, filed on Oct. 30, 2015, which claims priority under 35 U.S.C. 119(e) to U.S. Provisional Application No. 62/072,998, filed on Oct. 30, 2014, all of which are hereby expressly incorporated by reference into the present application.

TECHNICAL FIELD

The present invention relates to wireless communications, and more particularly, to a method and apparatus for performing radio resource management (RRM) measurements in an unlicensed band in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities.

Further, as the demands on data rate keeps increasing, the utilization/exploration on new spectrum and/or higher data rate is essential. As one of a promising candidate, utilizing unlicensed spectrum, such as 5 GHz unlicensed national information infrastructure (U-NII) radio band, is being considered. As it is unlicensed, to be successful, necessary channel acquisition and completion/collision handling and avoidance are expected. As LTE is designed based on the assumption that a UE can expect DL signals from the network at any given moment (i.e., exclusive use), LTE protocol needs to be tailored to be used in non-exclusive manner. In terms of non-exclusive manner, overall two approaches may be considered. One is to allocate time in a semi-static or static manner (for example, during day time, exclusive use, and during night time, not used by LTE), and the other is to compete dynamically for acquiring the channel. The reason for the completion is to handle other radio access technology (RAT) devices/networks and also other operator's LTE devices/networks.

By introduction of the unlicensed spectrum, a method for performing radio resource management (RRM) measurement in the unlicensed spectrum may be required.

DISCLOSURE OF INVENTION

Technical Problem

The present invention provides a method and apparatus for performing radio resource management (RRM) measurements in an unlicensed band in a wireless communication system. The present invention provides a method for and apparatus performing an inter-frequency measurement in an unlicensed band. The present invention provides a method and apparatus for configuring independent measurement gap for licensed band carriers and unlicensed band carriers.

Solution to Problem

A method and apparatus for configuring, by a user equipment (UE), a measurement gap for an unlicensed carrier in a wireless communication system is provided. The method includes configuring a first measurement gap for a licensed carrier, and configuring a second measurement gap, which is different from the first measurement gap, for the unlicensed carrier.

In another aspect, a user equipment (UE) is provided. The UE includes a memory, a transceiver, and a processor coupled to the memory and the transceiver, and configured to configure a first measurement gap for a licensed carrier, and configure a second measurement gap, which is different from the first measurement gap, for the unlicensed carrier.

Advantageous Effects of Invention

RRM measurements in an unlicensed band can be performed efficiently.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows a method for performing measurement over wider bandwidth while processing data over narrower bandwidth according to an embodiment of the present invention.
FIG. 7 shows 1.4 MHz center frequency in 20 MHz bandwidth according to an embodiment of the present invention.
FIG. 8 shows 3 MHz center frequency in 20 MHz bandwidth according to an embodiment of the present invention.
FIG. 9 shows 5 MHz center frequency in 20 MHz bandwidth according to an embodiment of the present invention.
FIG. 10 shows 10 MHz center frequency in 20 MHz bandwidth according to an embodiment of the present invention.
FIG. 11 shows one center frequency per carrier bandwidth according to an embodiment of the present invention.
FIG. 12 shows a set of center frequencies regardless of system bandwidth according to an embodiment of the present invention.
FIG. 13 shows a method for configuring a measurement gap for an unlicensed carrier according to an embodiment of the present invention.
FIG. 14 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDCCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In unlicensed spectrum (or, unlicensed band) where LTE devices may coexist with other radio access technology (RAT) devices such as Wi-Fi, Bluetooth, etc., it is necessary to allow a UE behavior adapting various scenarios. In LTE in unlicensed spectrum (LTE-U), various aspects for 3GPP LTE described above may not be applied for LTE-U. For example, the TTI described above may not be used for LTE-U carrier where variable or floating TTI may be used depending on the schedule and/or carrier sensing results. For another example, in LTE-U carrier, rather than utilizing a fixed DL/UL configuration, dynamic DL/UL configuration based on scheduling may be used. However, due to UE characteristics, either DL or UL transmission may occur at time. For another example, different number of subcarriers may also be utilized for LTE-U carrier.

By the nature of unlicensed band, it is expected that each device using the unlicensed band should apply a type of polite access mechanism not to monopolize the medium and not to interfere on-going transmission. As a basic rule of coexistence between LTE-U devices and Wi-Fi devices, it may be assumed that on-going transmission should not be interrupted or should be protected by proper carrier sensing mechanism. In other words, if the medium is detected as busy, the potential transmitter should wait until the medium becomes idle. The definition of idle may depend on the threshold of carrier sensing range.

Therefore, in terms of transmitting discovery/measurement signals, it is also considered to utilize carrier sensing before transmission (i.e. listen-before-talk (LBT)) or transmit measurement signals without LBT. Hereinafter, it is assumed that discovery/measurement signals are transmitted rather periodically either based on LBT with reservation or without LBT. As unlicensed band is wideband such as more than 160 MHz system bandwidth, if 20 MHz system bandwidth of a LTE carrier is used, more than 8 carriers can be configured/operated in a chunk of unlicensed band. When following typical LTE-operation with 20 MHz system bandwidth system, it means that to measure one entire Wi-Fi system, a UE needs to measure at least 8 frequencies. This may increase the UE complexity and burden in terms of measurement. Particularly, as unlicensed band may be an additional band other than licensed band, this additional cell search may add great burden on UE complexity.

As accessing unlicensed band may require different functionality such as LBT and other necessary sensing mechanisms to support regulatory requirements, and also, the radio frequency (RF) requirement on unlicensed band may be different from licensed band, it is unclear whether any RF/baseband supporting licensed band can be utilized for unlicensed band or a dedicated unlicensed band RF/baseband is needed. Hereinafter, a separate RF/baseband which can be utilized only for unlicensed band is considered. That is, RF/baseband for licensed band and RF/baseband for unlicensed band may be separated from each other. This additional hardware may be able to support also Wi-Fi signal generation/reception if needed. To support this, the followings signaling regarding UE-capability may be necessary.

Unlicensed band and/or band-combinations that the UE supports: unlicensed band and/or band combination that this additional hardware can support may be signaled. When signaled, the network may assume that a UE may be configured with carriers in licensed band as well as carrier(s) in unlicensed band. In other words, a UE can process both carriers from licensed carrier and carriers from unlicensed carrier.

Whether this additional capability may be used for carrier aggregation of licensed band carrier(s): for example, if the UE supports maximum 40 MHz, whether this capability may be used for licensed band carriers may be signaled. Generally, baseband may be shared.

Supported measurement bandwidth: assuming a UE may support larger bandwidth than 20 MHz for a carrier at least for measurement purpose, the UE may report the supported bandwidth of measurement. Based on this capability, the network may configure inter-frequency measurement.

Regarding UE-category, a new UE category may be introduced per each category or it may be signaled as a capability to support unlicensed band carrier(s). If this is reported as a capability, the peak data rate may be inferred from the capability signaling.

Now that a UE may have multiple frequencies to search and the UE has at least two RF/baseband capabilities to support one licensed band and one unlicensed band, whether a measurement gap should be shared between licensed band carriers and unlicensed band carriers are not clear. For example, RF used for unlicensed band may be usable only for unlicensed band, thus, measurement gap required for licensed band carriers may not be needed for measurements on unlicensed band carriers. Particularly, whether any inter-frequency measurement in unlicensed band carriers is needed may also not be clear.

In order to solve the problem described above clearly, a method for configuring independent measurement gaps for licensed band carriers and unlicensed band carriers may be proposed according to an embodiment of the present invention. Furthermore, according to an embodiment of the present invention, separate measurement gaps for intra-operator cell measurements and inter-operator cell measurements may be configured as well. To support this, whether a measurement gap is needed or not may be signaled by the UE separately for licensed band carriers and unlicensed band carriers. This also means that separate requirement on cell detection/measurement latency/accuracy may be defined for licensed band carriers and unlicensed band carriers, respectively. Also, separate requirements on cell detection/measurement latency/accuracy may be defined for cells of intra-operator and inter-operator. For the sake of convenience, hereinafter, carrier in licensed band is called as L-carrier whereas carrier in unlicensed band as U-carrier. For measurement gap for U-carrier, the followings may be considered.

Longer measurement gap interval (such as 200 ms): inter-frequency measurement in U-carrier is mainly to identify a frequency with low load or low interference level such that the serving cell may switch its frequency or the UE may switch to different frequency. Thus, rather infrequent measurement may be acceptable. Besides, it may also be expected that measurement in U-carrier is performed rather aperiodically and on-demands. Thus, aggregation over multiple measurement gap for one inter-frequency or a cell may not be necessary.

Longer measurement gap duration (such as 40 ms): as measurement signals such as discovery signals are not aligned among cells in one frequency, the UE may require longer time to perform measurement in one frequency. With longer measurement gap, the UE may also be configured by the serving cell the offset or a rough timing information when discovery signals may be transmitted in a frequency (at least for cells owned by the same operator to the serving cell's). Particularly, to search inter-operator cells, rather long duration may be needed as the timing is not aligned with cells of intra-frequency when inter-operator cell may transmit discovery signals or measurement signals.

Based on the description above, measurement requirement and latency may be relaxed as well. For example, for inter-operator cells, the requirement is to report only interference level rather than reference signal received power (RSRP). As there may be different requirement for intra-operator cells and inter-operator cells, the UE may be configured by the network to assist findings of intra-operator cells. One approach is to configure a list of cells of the same operator per frequency. Another approach is to configure a range of cell identifier (ID) where the same operator is using in the frequency such that the UE can determine the operator based on cell ID. Alternatively, system information type channel which includes operator information such as public land mobile network (PLMN) may be transmitted. Each cell may also include a set of cell IDs sharing the same operator in its system information type channel.

The UE supporting U-carrier may also be equipped with Wi-Fi module such as IEEE 802.11ac. Thus, for measurement, utilizing Wi-Fi module may also be considered. For example, between LTE and Wi-Fi, time division multiplexing (TDM) type measurement may also be utilized where Wi-Fi measurements are reported to the serving cell. To allow certain time for Wi-Fi measurement, a separate measurement gap may also be considered for Wi-Fi measurement where the UE can switch to Wi-Fi RF for the measurement. Even without utilizing Wi-Fi measurement, it is natural to assume that UE RF can support wideband such as 160 MHz for unlicensed band, particularly if one RF is shared between LTE-U and Wi-Fi where Wi-Fi supports 80 MHz or optionally 160 MHz (such as in 802.11ac). Thus, with some modification in data reception, the UE may receive up to 80 MHz or optionally 160 MHz.

Accordingly, to minimize the necessity of measurement gap in unlicensed band and minimize the interruption for measurement, a method for perform measurement over wider bandwidth such as 80 MHz or optionally 160 MHz while the UE may support data processing of only 20 MHz or multiple of 20 MHz if carrier aggregation is supported in U-carrier may be proposed according to an embodiment of the present invention. For the measurement, the UE may store additional REs for measurement.

FIG. 6 shows a method for performing measurement over wider bandwidth while processing data over narrower bandwidth according to an embodiment of the present invention. Referring to FIG. 6, UE1 may be able to measure wider bandwidth (such as 160 MHz), whereas it may only process data within 20 MHz (system bandwidth of the associated cell). Before data decoding, the UE may store wideband raw data or only measure reference signal (RS) or only measure RS OFDM symbols and process radio resource management (RRM) measurement on wideband. By this approach, the UE may also measure some interference level in other frequency region than the serving frequency.

Though a UE may be able to receive signals in wider system bandwidth than its processing bandwidth, measurement such as RSRP may not be easily achievable as tight network synchronization may not be achieved. For example, in FIG. 6, Lu2 and Lu1 may have different timing, and thus, tracking information based on signals from Lu1 may not be applicable for measurement for Lu2. Thus, it may be challenging to measure RSRP in different frequency region than the serving frequency.

Thus, a method for measuring only received signal strength indicator (RSSI) for other frequencies may be proposed according to an embodiment of the present invention. If the serving cell transmits wideband measurement RS, reference signal received quality (RSRQ) may be measured per each frequency location. To measure RSSI, the network may configure a set of frequency region where RSSI should be measured or a set of prefixed frequency region may be measured as well. The network may configure whether to measure RSRP/RSRQ or only RSSI per frequency region respectively. Before discussing the detailed design on inter-frequency RSSI, some clarification on channelization and carrier bandwidth may be needed first.

In terms of channel/carrier structure in LTE-U band (wideband), the supported system bandwidth of a carrier may be configured as follows.

(1) Always 20 MHz fixed: to support larger bandwidth, CA should be used.

(2) Flexible among 1.4 MHz, 3 MHz, 5 MHz, 10 MHz and 20 MHz: to support larger bandwidth, CA should be used.

(3) Flexible among 20 MHz, 40 MHz, 80 MHz, and 160 MHz (4) Multiple of X MHz: for example, X may be 2 where system bandwidth may be determined as a multiple of 2 MHz. In this case, M=20/X center frequency may be defined per each X MHz system bandwidth where a UE may assume that all center frequency within 20 MHz will be punctured (i.e. NULL transmission). Alternatively, direct current (DC) may not be used for all carriers.

When option (2) described above, i.e. Flexible among 1.4 MHz, 3 MHz, 5 MHz, 10 MHz and 20 MHz, is assumed, how to align different system bandwidth of a carrier among cells of both intra and inter-operator may be proposed according to an embodiment of the present invention. One of the following options may be considered.

(1) Center frequency of each carrier may be flexible. A carrier may determine its own bandwidth and center frequency freely. However, this option may cause interference and may challenge inter-cell interference coordination (ICIC) among cells. Particularly, when frequency division multiplexing (FDM) is used, this becomes a bit unclear how each cell determines its center frequency and bandwidth with minimizing the impacts on other cells.

(2) For each system bandwidth, a set of possible center frequency may be predetermined where each carrier may select only one of them. A separate set of center frequency may also be defined per each bandwidth. However, this option may allow different center frequency per carrier bandwidth, and it makes measurement a bit challenging.

FIG. 7 shows 1.4 MHz center frequency in 20 MHz bandwidth according to an embodiment of the present invention. FIG. 8 shows 3 MHz center frequency in 20 MHz bandwidth according to an embodiment of the present invention. FIG. 9 shows 5 MHz center frequency in 20 MHz bandwidth according to an embodiment of the present invention. FIG. 10 shows 10 MHz center frequency in 20 MHz bandwidth according to an embodiment of the present invention. Referring to FIG. 7 to FIG. 10, the arrow shows potential center frequencies. The center frequency for each bandwidth may be selected from potential center frequencies.

(3) Only one center frequency per carrier bandwidth may be assigned within 20 MHz. The network may select the carrier bandwidth, yet the center frequency is fixed per carrier bandwidth.

FIG. 11 shows one center frequency per carrier bandwidth according to an embodiment of the present invention. Referring to FIG. 11, the center frequency is fixed per carrier bandwidth.

(4) A set of center frequencies may be fixed regardless of system bandwidth. For example, when this option is used, for center frequency, the UE may assume that it will be punctured (i.e. NULL signal will be used) regardless of system bandwidth.

FIG. 12 shows a set of center frequencies regardless of system bandwidth according to an embodiment of the present invention. Referring to FIG. 12, a set of center frequencies is fixed regardless of system bandwidth.

It may be noted that a potential center frequency will be punctured (i.e. NULL signal will be used) regardless of system bandwidth of a carrier. Depending on the layout of center frequency and the carrier bandwidth, the UE may have multiple DCs in one carrier.

When different system bandwidth than 20 MHz (or multiple of 20 MHz) is used within 20 MHz system bandwidth that Wi-Fi system is using for unlicensed band, the set of frequency region where RSSI can be measurement may be different. To handle various scenarios, the UE may rely on the network configuration to determine a set of frequency regions which may include the center frequency and measurement bandwidth per each frequency region. For example, if the system bandwidth is 1.4 MHz, the network may configure all possible 1.4 MHz carrier within 20 MHz to measure the interference level such that the network may change its frequency (e.g. RSSI_F1={center frequency 1, 1.4 Mhz}, RSSI_F2={center frequency 2, 1.4 Mhz}, ... RSSI_Fk={center frequency K, 1.4 Mhz} may be configured). For those measured RSSI, periodic reporting or event-triggered reporting may be supported. For event-triggered reporting, if RSSI becomes below a certain threshold (configured by higher layer), the frequency region and its value may be reported.

Alternatively, RSSI over 20 MHz system bandwidth (i.e. assume one frequency region bandwidth is 20 MHz), regardless of its system bandwidth, may be measured.

Similar to channel state information (CSI) feedback, RSSI measurement on both 20 MHz and a set of configured frequency region by higher layer may be reported as well. For example, when reporting wideband RSSI, the UE may report RSSI results based on 20 MHz carrier bandwidth assumption. If the entire system bandwidth of an unlicensed band is 160 MHz, the UE may report up to 8 wideband RSSI. When reporting subband RSSI, the UE may report RSSI results on the configured frequency regions by higher layer. Alternatively, the UE may select a few best RSSI frequency regions. In this case, the frequency region information such as center frequency or frequency region ID may also be indicated along with results.

Moreover, if the UE supports lower measurement bandwidth or the same measurement bandwidth to maximum system bandwidth of a carrier (e.g. 20 MHz), to support many frequencies for inter-frequency measurement efficiently, the network may configure a list of frequencies to perform measurement. The list may be configured separately for RSRP/RSRQ and RSSI respectively. The list may not mandate the UE not to look for other frequencies. The list may be treated as priority list. In terms of reporting, when configured in measurement object, the UE may be configured with measurement result type between {RSRP, RSRP/RSRQ, RSSI}.

FIG. 13 shows a method for configuring a measurement gap for an unlicensed carrier according to an embodiment of the present invention.

In step S100, the UE configures a first measurement gap for a licensed carrier. In step S110, the UE configures a second measurement gap, which is different from the first measurement gap, for the unlicensed carrier. The first measurement gap may include a first measurement gap interval and a first measurement gap duration, and the second measurement gap may include a second measurement gap interval and a second measurement gap duration. The second measurement gap interval may be longer than the first measurement gap interval. The second measurement gap duration may be longer than the first measurement gap duration. The UE may further transmit a first indication indicating whether or not the first measurement gap for the licensed carrier is needed to a network. The UE may further transmit a second indication indicating whether or not the second measurement gap for the unlicensed carrier is needed to a network.

a bandwidth of the unlicensed carrier may be one of 1.4 MHz, 3 MHz, 5 MHz, 10 MHz or 20 MHz. A center frequency of the unlicensed carrier may be selected from a possible set of center frequencies for the bandwidth of the unlicensed carrier. A center frequency of the unlicensed carrier may be fixed for the bandwidth of the unlicensed carrier. A center frequency of the unlicensed carrier may be fixed regardless of the bandwidth of the unlicensed carrier.

The UE may further receive an indication indicating whether to measure RSSI or RSRP/RSRQ. The UE may further measure either the RSSI or RSRP/RSRQ according to the indication. The RSSI or RSRP/RSRQ may be measured per frequency. The RSSI may be measured for frequencies other than a serving frequency.

FIG. 14 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for a user equipment (UE) in a wireless communication system, the method comprising:
   receiving, by the UE, data in a first bandwidth of an unlicensed carrier, wherein the first bandwidth is a bandwidth of a serving cell frequency;
   receiving, by the UE, information on reference signals (RSs) configured in a second bandwidth of the unlicensed carrier, wherein the second bandwidth is wider than the first bandwidth;
   configuring, by the UE, a measurement gap, for the unlicensed carrier; and
   measuring, by the UE, the RSs based on the measurement gap.

2. The method of claim 1, further comprising transmitting information on whether or not the measurement gap for the licensed carrier is needed to a network.

3. The method of claim 1, wherein the second bandwidth of the unlicensed carrier is one of 1.4 MHz, 3 MHz, 5 MHz, 10 MHz or 20 MHz.

4. The method of claim 3, wherein a center frequency of the unlicensed carrier is selected from a possible set of center frequencies for the second bandwidth of the unlicensed carrier.

5. The method of claim 3, wherein a center frequency of the unlicensed carrier is fixed for the second bandwidth of the unlicensed carrier.

6. The method of claim 3, wherein a center frequency of the unlicensed carrier is fixed regardless of the second bandwidth of the unlicensed carrier.

7. The method of claim 1, wherein each of the RSs is at least one of a received signal strength indicator (RSSI) or a reference signal received power (RSRP) divided by a reference signal received quality (RSRQ).

8. The method of claim 1, wherein each of the RSs is measured per frequency.

9. A user equipment (UE) comprising:
   a memory;
   a transceiver; and
   a processor coupled to the memory and the transceiver, and configured to:

control the transceiver to receive data in a first bandwidth of an unlicensed carrier, wherein the first bandwidth is a bandwidth of a serving cell frequency, control the transceiver to receive information on reference signals (RSs) configured in a second bandwidth of the unlicensed carrier, wherein the second bandwidth is wider than the first bandwidth, configure a measurement gap for the unlicensed carrier, and measure the RSs based on the measurement gap.

10. The UE of claim 9, wherein the processor is further configured to transmit information on whether or not the measurement gap for the licensed carrier is needed to a network.

11. The UE of claim 9, wherein the second bandwidth of the unlicensed carrier is one of 1.4 MHz, 3 MHz, 5 MHz, 10 MHz or 20 MHz.

12. The UE of claim 11, wherein a center frequency of the unlicensed carrier is selected from a possible set of center frequencies for the second bandwidth of the unlicensed carrier.

13. The UE of claim 11, wherein a center frequency of the unlicensed carrier is fixed for the second bandwidth of the unlicensed carrier.

14. The UE of claim 11, wherein a center frequency of the unlicensed carrier is fixed regardless of the second bandwidth of the unlicensed carrier.

15. The UE of claim 9, wherein each of the RSs is at least one of a received signal strength indicator (RSSI) or a reference signal received power (RSRP) divided by a reference signal received quality (RSRQ).

* * * * *